Aug. 11, 1931.  S. H. HELLAND  1,818,555
DETACHING ROLL MOTION
Filed Sept. 5, 1929
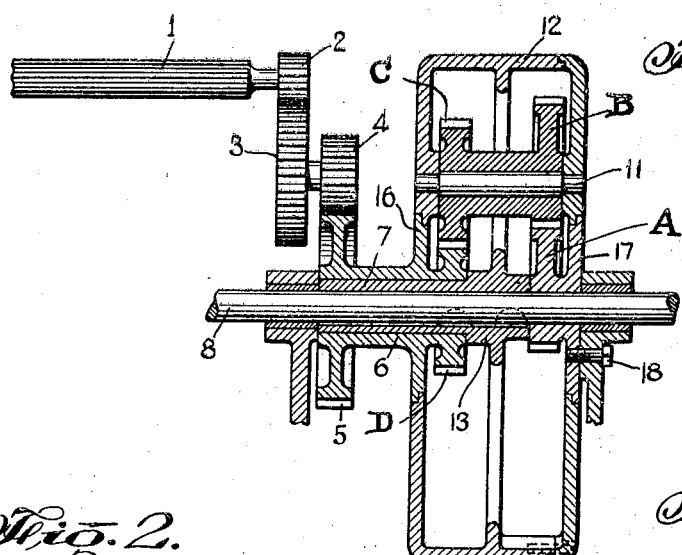
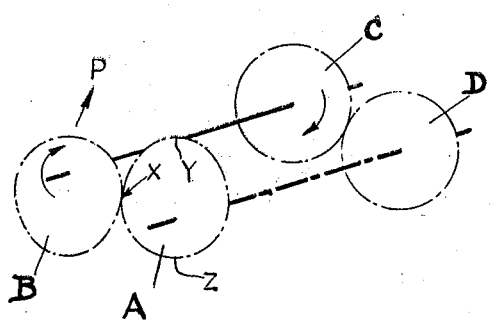
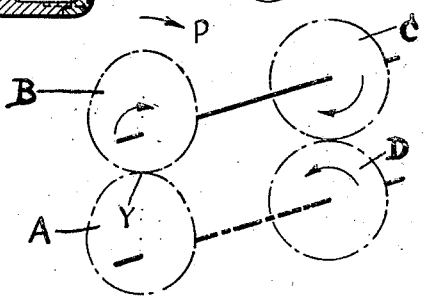
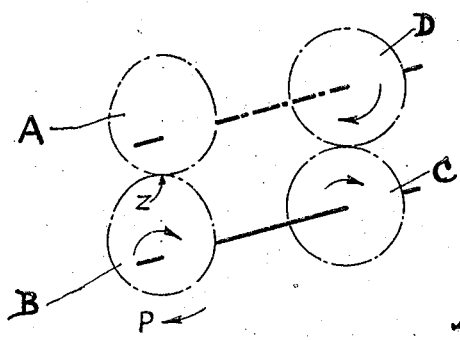
Sigurd H. Helland
INVENTOR.
BY Jeffery Kimball & Eggleston
ATTORNEYS.

Patented Aug. 11, 1931

1,818,555

UNITED STATES PATENT OFFICE

SIGURD H. HELLAND, OF WHITINSVILLE, MASSACHUSETTS, ASSIGNOR TO WHITIN MACHINE WORKS, OF WHITINSVILLE, MASSACHUSETTS, A CORPORATION OF MASSACHUSETTS

DETACHING ROLL MOTION

Application filed September 5, 1929. Serial No. 390,476.

The object of the invention is a variable motion derived from a constant rotational drive, without the use of cams, mutilated gears or reciprocating links, primarily suited to the requirements of the detaching rolls of cotton combers, which rolls are required to rotate step-by-step in one direction and, alternately with such movements, through a smaller angle in the reverse direction, so as to detach a tuft from the lap and feed it back a short distance to present the tail of the tuft to the comb and in overlapping relation to the leading edge of the lap. This general motion and the several operations referred to being well known and common to the art, no further description is necessary.

The invention comprises a gear set, including elliptical or eccentric gears compounded with sun and planet pinions, and capable of organization to produce any one of a variety of motions by the selection of gears or pinions of relative size appropriate to the requirements of the particular machine, the gear set being of compact form and arranged so as to be readily applied to existing machines without requiring structural changes of any moment, and being capable of operation at high speed without shock or undue vibration, as will presently appear.

In the preferred embodiment of the invention shown in the drawings, Fig. 1 is a section through the gear set showing such parts of a cotton comber as are necessary to understand the application of the invention, and Figs. 2, 3 and 4 are diagrams illustrating the principle of operation.

In Fig. 1 the detaching roll marked 1, which is one of the usual pair of rolls, is driven through spur gears 2, 3, 4 and 5. Gear 5 is secured to a sleeve 6 which is journalled to rotate freely on an inner sleeve 7 in turn supported by the usual comb cylinder shaft 8 or a shaft rotating equally therewith. The invention permits the use of the comb cylinder shaft as the driver of the system which is an advantage in the direction of simplicity and low manufacturing cost. The new gear set constitutes the transmission between the driver and the driven member, and in preferred form comprises an epicyclic unit of which the eccentric gears are a part. As shown, sun and planet gears A and B, are of eccentric form, and for simplicity and economy are preferably of equal size. Gear A is mounted on the comb cylinder shaft and gear B on a planet shaft 11 which, as usual in epicyclic gearing is arranged to permit rotation of the planet gear on its own axis and to revolve about what is usually termed the fixed axis i. e. the axis of shaft 8. In the form shown the planet shaft is supported in the side walls of a casing 12 the hub 13 of which is mounted on the comb cylinder shaft. Sleeve 7 is integral with hub 13. The planet shaft may of course be carried by a spider arm, or otherwise, but the casing is preferred in that it provides an enclosure for the various gears and may contain an oil bath for them.

In accordance with this design eccentric gear B is formed integrally with a circular planet pinion C in turn meshing with a cicular sun pinion D which is mounted to rotate on and relatively to sleeve 7.

In common with epicyclic gearing generally, it is immaterial which of the sun gears is fixed and whether the casing or one of such gears is driven, but as here shown, the casing is driven and for this purpose its hub 13 is keyed to the comb cylinder shaft. The casing sidewalls are lapped over the peripheries of plates 16 and 17 which are secured respectively to sleeve 6 and gear A to form the enclosure, although as will be understood these parts may be variously constructed to permit the casing to rotate on its axis and with respect to the sun gears. Plate 17 is secured to a part of the comber stand, as by stud 18, so that gear A is the stationary member of the system and accordingly gear D, which becomes a moving member, is secured to sleeve 6 as the driver for gear train 5, 4, 3, 2.

Before describing the operation of the drive as thus applied to a cotton comber reference will be made to Figs. 2, 3 and 4 wherein the several parts are shown diagrammatically, the casing being omitted although, as will be understood, it is driven by shaft 8 and operates to carry the planet shaft around the fixed axis at a uniform speed.

In these figures gears C and D, are shown of equal size but, as will presently appear, they are the variables which are selected with reference to the particular motion desired; A and B are the eccentric gears; $r$ is the acting radius of the planet eccentric gear; R is the acting radius of the fixed or sun eccentric gear, both $r$ and R varying according to the relative positions of A and B; and S the speed of rotation of the casing, i. e. of the planet shaft as a whole about the axis of gears A and D, above referred to as the fixed axis. The direction of rotation of the casing and system is indicated by arrow P, the planet gears B and C then always rotating in the direction indicated by their arrows.

While rolling around the fixed eccentric gear A, B will make contact with it at a point such as X (Fig. 2) where R is equal to $r$, there being two such points, as will be understood. Under this condition the drive ratio of A to B is 1 to 1 which means that the speed of rotation of gear C (about the axis of the planet shaft) is 2S—this being a normal incident of planetary construction.

Gear B will presently make contact with A at a point such as Y (Fig. 3) where the drive ratio R to $r$ is a maximum. At this instant the speed of rotation of gear C is $\frac{R}{r}$ 2S, where $\frac{R}{r}$ is greater than 1.

Gear B will also presently make contact with A at a point such as Z (Fig. 4) where the drive ratio R to $r$ is a minimum. At this instant the speed of rotation of gear C is $\frac{R}{r}$ 2S, where $\frac{R}{r}$ is less than 1.

Since gears C and D are assumed to be of equal size, the three conditions mentioned will give the following results: At points X, gear D will be stationary, C rotating on its axis at twice the speed of the casing and accordingly rolling on D without driving it; at point Y, gear D will be driven in the direction of its arrow (Fig. 3) due to the fact that C is then rotating faster than "rolling speed"; at point Z, gear D will be driven in the reverse direction, as indicated by the arrow in Fig. 4, due to the fact that C is then rotating slower than "rolling speed."

For convenience the various phases of movement are referred to as points on the gear A, but it will be understood that they represent only the maximum speed in each direction and that they are approached and left respectively at varying speed.

As stated, the foregoing is based on the assumption that C and D are of equal size.

Taking now the position shown in Fig. 2, which shows the relation of the dwell or stopping points to the "drive points," it will be apparent that the location of these dwell points is as indicated, i. e. where R equals $r$, only because C and D are of equal size. In general, gear D will be stationary for any sizes of gears C and D, whenever the ratio of gear teeth D to C equals the drive ratio R to $r$, which is the relationship required for "rolling" of the planet gears as distinguished from "driving." Similarly gear D will be rotated in a counter-clockwise direction whenever (in terms of gear teeth ratio) R to $r$ is greater than D to C, and a clockwise direction when R to $r$ is less than D to C. It follows therefore that by using gears of different sizes (C and D) the stopping or dwell points can be caused to occur whenever desired in relation to the forward and backward (maximum and minimum) drive points, thereby adding to the forward movement and subtracting from the backward movement, or vice versa. By way of illustration, as the number of teeth on C (relative to D) is increased, so the dwell points (X) automatically move toward the point Z (Fig. 2), i. e. to satisfy the requirement of the dwell points that the ratio R : $r$ equal the ratio D : C. In the limit, which occurs when the radius of C equals the maximum of $r$ (and the radius of D equals the minimum of R), the dwell points coincide with point Z, or, in other words, R to $r$ can never be less than D to C and therefore clockwise rotation of D (Fig. 4) is eliminated. Similarly, if the number of teeth on C is decreased relative to D, in the limit, the dwell points coincide with point Y and the counter-clockwise rotation of D (Fig. 3) is eliminated.

While approaching the limit, where either the X motion or the Y motion vanishes, such motion diminishes relatively to the other motion, resulting in a progressive rotation of gear D notwithstanding its alternate backward movements. It is a motion of this latter nature that is required for the comber detaching roll, as above explained, and (reverting now to Fig. 1) it is obtained by the use of gears C and D differing in size an amount appropriate to the requirements of the particular machine. In the present case the ratio of the number of teeth on these two gears is 41 to 40, although whether gear C or gear D is the larger of the two is dependent only upon the nature of the intermediate gearing 2, 3, 4 and 5, that is to say, whether such gearing is arranged to drive the detaching roll in the same direction as the sleeve 6 or in the opposite direction.

The operation of the gear set as applied to a comber will now be apparent. Upon rotation of the comb cylinder shaft casing 12 is rotated, carrying with it the planet shaft and its planet gears B and C. Eccentric gear B is operated by eccentric gear A alternately faster and slower than "rolling speed" whereby gear D is rotated alternately forwards and backwards. On account of the difference in size of gears C and D these forward and backward movements are unequal, as above explained, with the result that the detaching roll, through gears 5, 4, 3 and 2, is actuated to detach successive tufts and feed each one backwards a short distance to provide the desired overlap, as above described.

The term "eccentric" as used herein contemplates, any gear form by which the speed of rotation of the planet gear (about its own axis) is caused to vary with respect to the speed of rotation of the planet shaft about the fixed axis, and without regard to whether such gears are symmetrical with respect to their axes of rotation.

I claim:

1. In a comber a detaching motion comprising an epicyclic gear system including two gear couples, each comprising a pair of intermeshing gears and one of the couples constituted of meshing eccentric gears correlated to the other gears to convert continuous unidirectional rotation into intermittent forward and backward rotation.

2. In a combing machine, the combination with the comb cylinder shaft and the detaching roll of an epicyclic gear system, comprising eccentric sun and planet gears, a sun pinion mounted coaxially with the eccentric sun gear, and a planet pinion meshing with said sun pinion and connected to rotate with the eccentric planet gear, said shaft and roll being connected respectively to drive and be driven by the gear set.

3. In a combing machine, the combination with the comb cylinder shaft and the detaching roll of an epicyclic gear system arranged to drive the latter from the former and comprising a sun gear and a planet gear, said gears being of equal size, and both of eccentric form, a sun pinion mounted coaxially with the sun gear and a planet pinion meshing with the sun pinion and connected to rotate with the planet gear, said pinions being of unequal size.

4. In a combing machine, the combination with the comb cylinder shaft and the detaching roll of an epicyclic gear system comprising a casing driven by said shaft, a sun gear of eccentric form mounted on the axis of the comb cylinder shaft, means for holding said gear stationary, a planet gear of eccentric form meshing with said gear and journalled in the casing for bodily rotation about said axis, a planet pinion connected to rotate with said planet gear, and a sun pinion meshing with the planet pinion and connected to drive the detaching roll.

5. In a comber having a drive shaft rotating at constant speed and a detaching roll, an epicyclic transmission between said shaft and roll for rotating the latter in one direction and, intermittently, a less amount in the reverse direction, comprising a pair of meshing sun and planet pinions of unequal size, a pair of meshing eccentric sun and planet gears, and a drive connection between the planet pinion and the eccentric planet gear.

In testimony whereof, I have signed this specification.

SIGURD H. HELLAND.